US010440713B2

(12) United States Patent
Gunasekara et al.

(10) Patent No.: US 10,440,713 B2
(45) Date of Patent: Oct. 8, 2019

(54) RESOURCE ALLOCATION IN A WIRELESS MESH NETWORK ENVIRONMENT

(71) Applicant: Time Warner Cable Enterprises LLC, St. Louis, MO (US)

(72) Inventors: Don Gunasekara, Reston, VA (US); Harriet DuBois, Herndon, VA (US); Kevin Caldwell, Vienna, VA (US); Laxman Nallani, Herndon, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 93 days.

(21) Appl. No.: 15/681,676

(22) Filed: Aug. 21, 2017

(65) Prior Publication Data
US 2017/0347357 A1  Nov. 30, 2017

Related U.S. Application Data

(60) Continuation of application No. 14/731,987, filed on Jun. 5, 2015, now Pat. No. 9,750,025, which is a (Continued)

(51) Int. Cl.
*H04W 28/20* (2009.01)
*H04W 28/16* (2009.01)
(Continued)

(52) U.S. Cl.
CPC ......... *H04W 72/0453* (2013.01); *H04L 47/70* (2013.01); *H04W 28/16* (2013.01);
(Continued)

(58) Field of Classification Search
CPC ........... H04L 29/12028; H04L 12/5695; H04L 41/0896; H04L 47/125; H04L 47/828;
(Continued)

(56) References Cited

U.S. PATENT DOCUMENTS

2004/0010592 A1* 1/2004 Carver ................... H04L 47/10
709/226
2004/0156367 A1  8/2004 Albuquerque et al.
(Continued)

*Primary Examiner* — Raj Jain
(74) *Attorney, Agent, or Firm* — Armis IP Law, LLC

(57) ABSTRACT

A mesh network management resource receives connectivity status information indicating wireless connectivity amongst multiple wirelessly interconnected access points in a mesh network and multiple clients. Based on the received connectivity status information, the mesh network management resource allocates portions of wireless bandwidth in the mesh network to wirelessly communicate between a root access point in the mesh network and each of the multiple interconnected access points. The root access point transmits messages over the allocated portions of wireless bandwidth from the root access point through the multiple interconnected access points to the multiple clients. According to one configuration, the mesh network management resource allocates use of wireless bandwidth amongst the wirelessly interconnected access points in the mesh network based at least in part on class of service information assigned to different subscribers in the mesh network environment.

21 Claims, 9 Drawing Sheets

Related U.S. Application Data division of application No. 13/857,430, filed on Apr. 5, 2013, now Pat. No. 9,072,092.

(51) Int. Cl.
  *H04W 92/20* (2009.01)
  *H04W 72/04* (2009.01)
  *H04L 12/911* (2013.01)

(52) U.S. Cl.
  CPC ....... *H04W 28/20* (2013.01); *H04W 72/0406* (2013.01); *H04W 92/20* (2013.01)

(58) Field of Classification Search
  CPC ....... H04L 47/20; H04L 45/02; H04L 47/781; H04L 47/822; H04W 40/00; H04W 28/20; H04W 72/048; H04W 28/16; H04W 92/20
  See application file for complete search history.

(56) References Cited

U.S. PATENT DOCUMENTS

| | | |
|---|---|---|
| 2007/0008981 A1 | 1/2007 | Pathan |
| 2007/0254672 A1* | 11/2007 | Dacosta ................ H04W 28/20 455/452.1 |
| 2007/0294410 A1 | 12/2007 | Pandya et al. |
| 2009/0041039 A1* | 2/2009 | Bear ....................... H04L 45/38 370/401 |
| 2010/0182914 A1 | 7/2010 | Delregno et al. |

\* cited by examiner

RESOURCE ALLOCATION IN A WIRELESS MESH NETWORK ENVIRONMENT

RELATED APPLICATIONS

This application is a continuation of U.S. patent application Ser. No. 14/731,987 entitled "RESOURCE ALLOCATION IN A WIRELESS MESH NETWORK ENVIRONMENT," filed on Jun. 5, 2015, the entire teachings of which are incorporated herein by this reference.

U.S. patent application Ser. No. 14/731,987 is a divisional of U.S. patent application Ser. No. 13/857,430 (now U.S. Pat. No. 9,072,092) entitled "RESOURCE ALLOCATION IN A WIRELESS MESH NETWORK ENVIRONMENT," filed on Apr. 5, 2013, the entire teachings of which are incorporated herein by this reference.

BACKGROUND

In general, a conventional Wireless Mesh Network (WMN) is a communications network made up of radio nodes organized in a mesh topology. A wireless mesh network can include multiple access points, multiple clients, multiple mesh routers, gateways, etc.

The interconnected radio nodes of a conventional mesh network can be configured to facilitate distribution of messages. For example, a first radio node in the mesh network can receive a communication targeted for delivery to a destination device. To deliver a message, the first radio node forwards the communication to a second communication node; the second radio node forwards the communication to a third communication node; and so on. Eventually, the radio nodes in the mesh network forward the communication to the appropriate target client.

Wireless mesh networks can be implemented with various wireless technologies including standards such as 802.11, 802.15, 802.16, cellular technologies or combinations of more than one type.

Certain conventional mesh networks sometimes allocate use of respective internal wireless bandwidth based on parameters such as hop count and RSSI (Received Signal Strength Indicator). For example, a mesh network can include a root access point. The root access point provides connectivity between a network such as the Internet and other access points in the mesh network.

When allocating available bandwidth based on hop count, a respective conventional mesh network typically allocates more bandwidth to access points disposed closer to the root access point. Access points further away from the root access point are allocated less bandwidth.

BRIEF DESCRIPTION OF EMBODIMENTS

Conventional mesh networks suffer from a number of deficiencies. For example, as mentioned, conventional mesh networks allocate bandwidth based on merely hop counts and RSSI (Received Signal Strength Indicator). If a mesh network is heavily loaded with clients at nodes farthest away from a root access point, there typically is insufficient bandwidth to support communications to such clients.

As an illustrative example, many clients can be communicatively coupled to a farthest node in the network at a highest number of hops away from the root access point. A single client may be connected to a wireless access point node nearest the root access point. In such an instance, in accordance with a conventional mesh network, the single client nearest the root access point receives the highest available data throughput, whereas the multiple clients coupled to the furthest node must share use of a small amount of available bandwidth at the furthest node. Accordingly, distribution of data to clients via a conventional mesh network can be inherently unfair.

Embodiments herein deviate with respect to conventional techniques. For example, one embodiment herein is directed to providing greater fairness of servicing multiple clients in a mesh network. In certain instances, the clients can subscribe to different class of services. Numbers of clients, classes of service, etc., are factors that can be taken into account when providing fair use of services to multiple clients coupled to a mesh network.

More specifically, one embodiment herein includes a mesh network management resource. The mesh network management resource receives connectivity status information indicating wireless connectivity amongst multiple interconnected access points and multiple clients in a mesh network. Based on the received connectivity status information, the mesh network management resource allocates portions of wireless bandwidth in the mesh network to wirelessly communicate between a root access point in the mesh network and the multiple interconnected access points. The root access point transmits messages over the allocated portions of wireless bandwidth from the root access point through the multiple interconnected access points to the multiple clients.

In one embodiment, the root access point receives communications directed to the multiple clients and initiates distribution of the communications over the allocated portions of wireless bandwidth in the mesh network to the multiple interconnected access points. The multiple interconnected access points, in turn, forward the communications in a wireless manner to the corresponding clients in communication with the wireless access points. Allocation of the portions of wireless bandwidth for communications amongst the interconnected access points based on the status information facilitates a fairer distribution of data.

As a further illustrative example, the mesh network management resource can receive at least a first data rate value and a second data value. The first data rate value represents a data rate assigned to a first client; the second data rate value represents a data rate assigned to a second client. The mesh network management resource can receive additional data values as well.

Assume in this example that the first client is wirelessly coupled to a first access point in a mesh network of multiple wirelessly interconnected access points. Assume further in this example that the second client is wirelessly coupled to a second access point in the mesh network of multiple wirelessly interconnected access points. The mesh network management resource processes the data rate information (e.g., data rate values) and allocates use of wireless bandwidth amongst the wirelessly interconnected access points in the mesh network based at least in part on the first data rate value and the second data rate value.

In a more specific example embodiment, the mesh network management resource utilizes the summation of data rate values as a basis to allocate a sufficient portion of available wireless bandwidth in the mesh network to support transmission of data through the mesh network at a rate as specified by the first data rate value to the first client and to support transmission of data through the mesh network at a rate as specified by the second data rate value to the second client. In other words, an access point located nearer the root access point may directly service a first client as well as pass a portion of data to a downstream access point that, in turn, transmits data to a second client. In such an instance, the management resource allocates sufficient bandwidth to the transmit data to the first access point to account for the combination of supported data service rates.

Thus, embodiments herein include allocating different portions of available wireless bandwidth in the mesh network to communicate between a root access point and the multiple interconnected access points based on different classes of data rate services assigned to the clients. Accordingly, certain embodiments herein provide greater fairness of delivering data to respective clients over conventional techniques.

Note that the mesh network management resource can reside at any suitable location in a network environment. For example, in one non-limiting example embodiment, the mesh network management resource resides in the root access point. Each of the access points can be configured to keep track of which clients are connected to the respective access point. The root access point can be configured to communicate with one or more of the multiple interconnected access points in the mesh network to retrieve data such as the connectivity status information indicating how many clients each of the access points services, number of clients connected to a respective access point, etc.

In one embodiment, the mesh network management resource processes the received connectivity status information to identify a number of clients wirelessly coupled to each of the multiple interconnected access points in the mesh network. The mesh network management resource then allocates the portions of wireless bandwidth in the mesh network based at least in part on a magnitude of the number of clients wirelessly coupled to each of the multiple interconnected access points. Allocation of the different portions of available wireless bandwidth can include allocating proportionally more of the available bandwidth to access points in the mesh network for access points servicing a greater numbers of clients.

As mentioned above, the allocation of bandwidth also can be based at least in part on data rate values assigned to the clients (subscribers) coupled to the mesh network. The data rate values assigned to different subscribers may vary depending on a class of service to which each respective client subscribes. For example, by way of a non-limiting example, a first class of service can support 10 megabits per second of data through the mesh network to a respective subscriber; a second class of service can support 20 megabits per second of data through the mesh network to a respective subscriber; a third class of service can support 30 megabits per second; and so on.

Information such as the data rate values and class of service information associated with a respective client can be retrieved from any suitable resource such as from the clients, from the access points, from a remote storage resource that stores subscriber information, etc.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor or logic, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by a processor of a respective computer device, cause the processor or multiple processors of the system to: receive connectivity status information indicating wireless connectivity amongst multiple interconnected access points in a mesh network and multiple clients; based on the received connectivity status information, allocate portions of wireless bandwidth in the mesh network to wirelessly communicate between a root access point in the mesh network and the multiple interconnected access points; and transmit messages over the allocated portions of wireless bandwidth from the root access point through the multiple interconnected access points to the multiple clients.

Yet another embodiment herein includes a computer readable storage medium and/or system having instructions stored thereon. The instructions, when executed by a processor of a respective computer device, cause the processor or multiple processors of the system to: receive a first data rate value, the first data rate value assigned to a first client wirelessly coupled to a first access point in a mesh network of multiple wirelessly interconnected access points; receive a second data rate value, the second data rate value assigned to a second client wirelessly coupled to a second access point in the mesh network of multiple wirelessly interconnected access points; and allocate use of wireless bandwidth amongst the wirelessly interconnected access points in the mesh network in accordance with the first data rate value and the second data rate value.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, logic, or as hardware alone such as within a processor, or within an operating system or a within a software application.

As discussed herein, techniques herein are well suited for allocating bandwidth in a wireless mesh network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary and details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

A mesh network management resource receives connectivity status information indicating wireless connectivity amongst multiple wirelessly interconnected access points in a mesh network and multiple clients. Based on the received connectivity status information, the mesh network management resource allocates portions of wireless bandwidth in the mesh network to wirelessly communicate between a resource such as a root access point in the mesh network and each of the multiple interconnected access points. The root access point transmits messages over the allocated portions of wireless bandwidth from the root access point over the mesh network through the multiple interconnected access points to the multiple clients. According to one configuration, the mesh network management resource allocates use of wireless bandwidth amongst the wirelessly interconnected access points in the mesh network based at least in part on a number of clients coupled to the wirelessly interconnected access points. According to another configuration, the mesh network management resource allocates use of wireless bandwidth amongst the wirelessly interconnected access points in the mesh network based at least in part on class of service information assigned to different subscribers in the mesh network environment.

Figure 1:
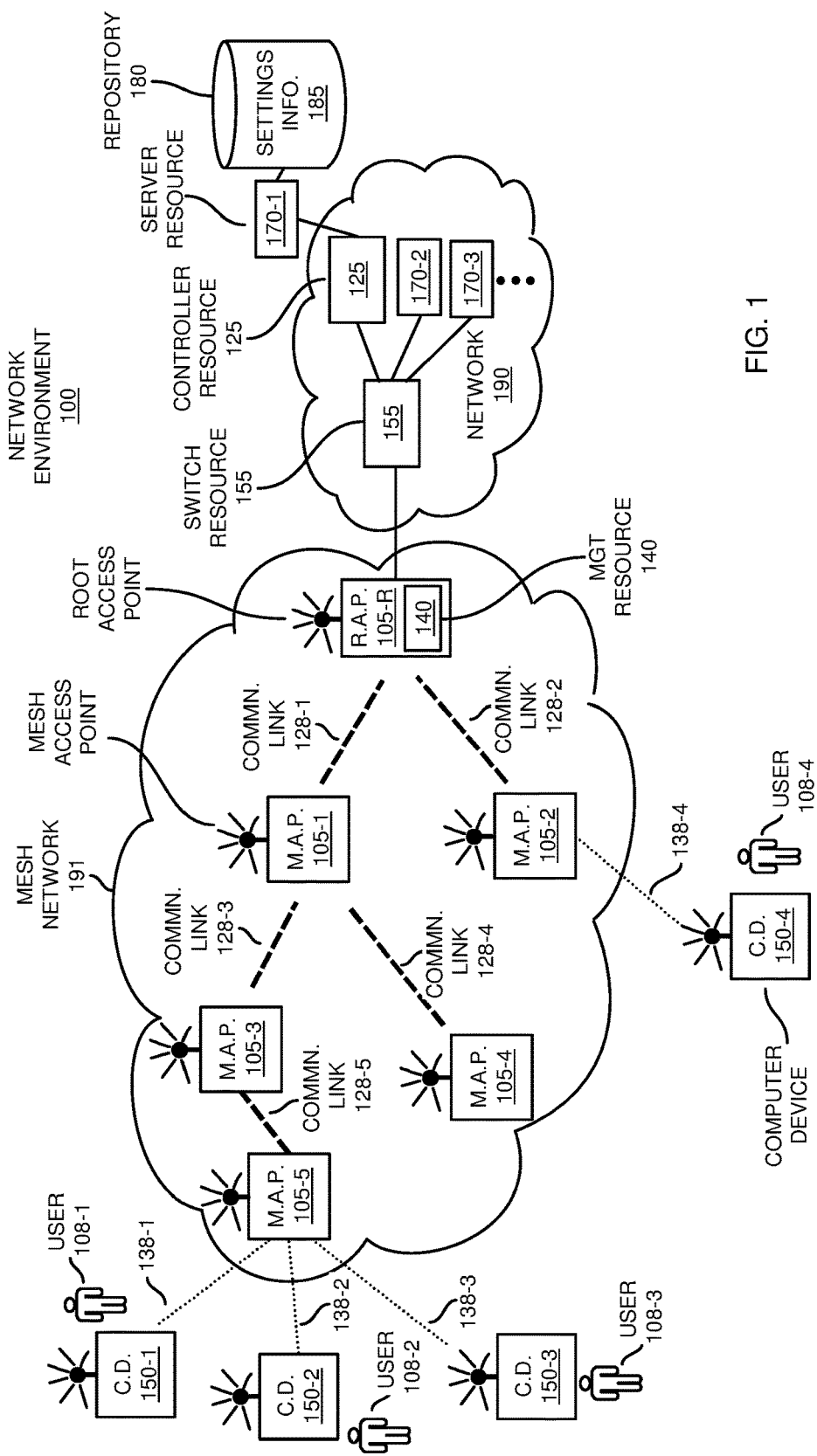
FIG. 1 is an example diagram illustrating a mesh network and corresponding mesh network management resource according to embodiments herein.

Now, more specifically, FIG. 1 is an example diagram illustrating a network environment including a mesh network according to embodiments herein.

As shown, network environment 100 includes network 190, mesh network 191, and multiple computer devices 150 (e.g., computer device 150-1, computer device 150-2, computer device 150-3, computer device 150-4, etc.). Users 108 (e.g., user 108-1, user 108-2, user 108-3, user 108-4, etc.) operate computer devices 150 to retrieve content over mesh network 191 through the root access point 105-R.

Each of computer devices 150 can be or include any suitable resource such as a mobile communication device, phone, personal computer system, a wireless device, base station, phone device, mobile phone, desktop computer, laptop, notebook, netbook computer, handheld computer, workstation, network computer, application server, storage device, a consumer electronics device such as a camera, camcorder, set top box, mobile device, video game console, handheld video game device, etc.

As shown in this example embodiment, mesh network 191 includes multiple wireless access points 105 (e.g., root access point 105-R, mesh access point 105-1, mesh access point 105-2, mesh access point 105-3, mesh access point 105-4, mesh access point 105-5, . . . ). Network 190 includes switch resource 155, controller 125, etc. Repository 180 stores accessible status information such as settings information 185.

By way of a non-limiting example, each of computer devices 150 can be stationary or mobile. Collectively, computer devices 150 utilize respective access points 105 in the mesh network 191 as a means to connect to a respective network such as the Internet or other suitable network. For example, each of the users 108 operates a respective computer device to establish a connection over the mesh network 191 with root access point 105-R. Thus, root access point 105-R can be configured to provide access to the Internet.

The connections in the mesh network 191 between a respective computer device and root access point 105-R can include one or more hops. For example, computer device 150-1 is connected to root access point 105-R via a path through the mesh network 191 including mesh access point 105-5, mesh access point 105-3, and mesh access point 105-1. Wireless communication link 138-1 supports communications between the computer device 150-1 and the mesh access point 105-5; wireless communication link 128-5 supports communications between the mesh access point 105-5 and mesh access point 105-3; wireless communication link 128-3 supports communications between the mesh access point 105-3 and mesh access point 105-1; wireless communication link 128-1 supports communications between the mesh access point 105-1 and root access point 105-R. At least a portion of bandwidth in the wireless links in the sequence of mesh access points 105-5, 105-3, and 105-1 supports communications between the computer device 150-1 and root access point 105-R.

As shown, the computer device 150-2 operated by user 108-2 is also wirelessly connected to mesh access point 105-5 via wireless communication link 138-2. In a similar manner as discussed above, the sequence of access points 105-5, 105-3, and 105-1 support bi-directional communications between the computer device 150-2 and the root access point 105-R.

The computer device 150-3 operated by user 108-3 is also wirelessly connected to mesh access point 105-5 via wireless communication link 138-3. In a similar manner as discussed above, the sequence of access points 105-5, 105-3, and 105-1 supports bi-directional communications between the computer device 150-3 and the root access point 105-R.

Computer device 150-4 is connected to root access point 105-R via a path through mesh access point 105-2. Wireless communication link 138-4 supports bi-directional communications between the computer device 150-4 and the mesh access point 105-2. Wireless communication link 128-2 supports single or bi-directional communications between the mesh access point 105-2 and root access point 105-R.

By way of a non-limiting example, the wireless links 138 between computer devices 150 and corresponding access points can be established in accordance with a WiFi™, 802.11, or any other suitable communications standard. The wireless links 128 amongst computer devices 150 and corresponding access points can be established in accordance with a WiFi™, 802.11, or any other suitable communications standard.

Access points 105 may provide public or private access services. For example, in certain instances, any of one or more access points 105 in network environment 100 may support free WiFi™ access services to users. In other embodiments, users must be authenticated in order to use the mesh network 191 to retrieve requested content.

Thus, use of any of one or more access points 105 may be subscription-based. In this latter instance, the user may be required to pay a fee, be a member of an organization, subscribe to other services, etc., in order to be granted use of the access points 105.

Network 190 includes controller 125. In one embodiment, among other functions, controller 140 facilitates connectivity of computer devices to the mesh network 191. For example, computer device 150-1 initially communicates with mesh access point 105-5 to establish a respective communication session between the computer device 150-1 and the mesh access point 105-5. In response to receiving a request message, the mesh access point 105-5 communicates through mesh network 191 to controller resource 125. The controller resource 125 communicates with server resource 170-1 to access settings information 185 associated with a respective user. In one embodiment, if the user 108-1 provides the appropriate username and password information, the controller resource 125 allows the mesh access point 105-5 to establish the wireless communication link 138-1.

Subsequent to establishing a respective wireless connection, the root access point 105-R serves as a gateway resource to computer devices 150. For example, the root access point 105-R can receive communications from the computer devices 150 via conveyance of messages through the mesh network 191. Each of the mesh access points 105 in the mesh network 191 can include a respective forwarding table indicating which upstream access point to forward a respective message toward the root access point 105-R. As mentioned, messages transmitted in the upstream direction to the root access point 105-R may pass through one or more access points along the way depending on a configuration of the forwarding tables and which of the multiple access points the users are connected.

The root access point 105-R is coupled (via a suitable link such as a wired connection to switch resource 155. Switch resource 155 forwards the communications received from root access point 105-R over network 190 to target destinations such as one or more server resources 170 (e.g., server resource 170-2, server resource 170-3, etc.). The communications generated by the computer devices to server resources 170 can be content request messages.

Server resources 170 respond to the communications via transmission of requested data through switch resource 155 to root access point 105-R. The switch resource 155 forwards the communications received from server resources 170 to root access point 105-R through mesh access points 105 in mesh network 191 to the corresponding computer devices 150.

Each of the access points in mesh network 191 can include a downstream routing table. The downstream routing table indicates to which downstream access point an access point is to forward a respective message.

As an illustrative example, the root access point 105-R can receive a message from network 190. The message can include a unique identifier value such as a network address indicating that the message is to be delivered to computer device 150-1. In such an instance, the root access point 105-R utilizes a downstream forwarding table to identify that mesh access point 105-1 is a next hop node in which to forward the message toward computer device 150-1. The mesh access point 105-1 utilizes its downstream forwarding table to identify that mesh access point 105-3 is a next hop node in which to forward the message. The mesh access point 105-3 utilizes its downstream forwarding table to identify that mesh access point 105-5 is a next hop node in which to forward the message. The mesh access point 105-5 then forwards the message over wireless communication link 138-1 to computer device 150-1.

In a similar manner, the mesh network 191 supports conveyance of addressed messages in an upstream manner from computer devices 150 and the root access point 105-R.

As discussed above, conventional management of mesh networks includes allocating a large amount of bandwidth to radio nodes nearer to a root access point. In the current example, and according to a conventional mesh network management, the computer devices 150-1, 150-2, and 150-3 would experience a poor level of service compared to computer device 150-4.

In contrast to conventional mesh networks and conventional allocation of wireless bandwidth amongst corresponding access points, embodiments herein include management resource 140. Management resource 140 can be located in any suitable one or more locations. In one embodiment, the management resource 140 is disposed in root access point 105-R.

As its name suggests, management resource 140 manages mesh network 191. For example, management resource 140 receives connectivity status information indicating wireless connectivity amongst multiple interconnected access points in a mesh network and multiple clients.

As a more specific example, in one embodiment, each of the mesh access points keep track of the different computer devices connected to it. For example, mesh access point 105-5 can be configured to keep track of connectivity status information indicating that computer device 150-1, 150-2, and 150-3 are wirelessly coupled to access point 105-5 via respective wireless communication links 138-1, 138-2, and 138-3; mesh access point 105-2 can be configured to keep track of connectivity status information indicating that computer device 150-4 is wirelessly coupled to access point 105-2 via respective wireless communication link 138-4; and so on.

Each of the mesh access points can be configured to forward their connectivity status information to root access point 105-R. Any suitable method can be used to forward the data. For example, the management resource 140 can be configured to occasionally or periodically transmit a respective query to each of the mesh access points in mesh network 191. The mesh access points respond with transmission of the connectivity status information. In accordance with further embodiments, the mesh access points can be configured to push the connectivity status information to the management resource 140 at the root access point 105-R.

Based on the received connectivity status information, the management resource 140 allocates portions of wireless bandwidth in the mesh network to wirelessly communicate between the root access point 105-R in the mesh network 191 and the multiple interconnected access points 105.

For example, in one embodiment, the management resource 140 identifies that there is a high number of users (e.g., user 108-1, user 108-2, and user 108-3) connected to mesh access point 105-5 compared to a low number of users (e.g., user 108-4) connected to mesh access point 105-2. In such an instance, the management resource 140 allocates sufficiently higher bandwidth for use on each of wireless communication links 128-1, 128-3, and 128-5 to accommodate the high number of users connected to mesh access point 105-5.

In other words, according to embodiments herein, a substantially high number of users connected to mesh access point 105-5 warrants that additional bandwidth be allocated to support such users. As mentioned, conventional mesh network management includes allocating less bandwidth resources to access points disposed a greater number of hops away from the root access point 105-R.

As further described herein, note that the management resource 140 can be configured to allocate wireless bandwidth in mesh network 191 based on any suitable one or more parameters. For example, further embodiments herein include allocating different portions of available wireless bandwidth in the mesh network to communicate between the root access point and the multiple interconnected access points based on different classes of data rate services assigned to the clients.

Figure 2:
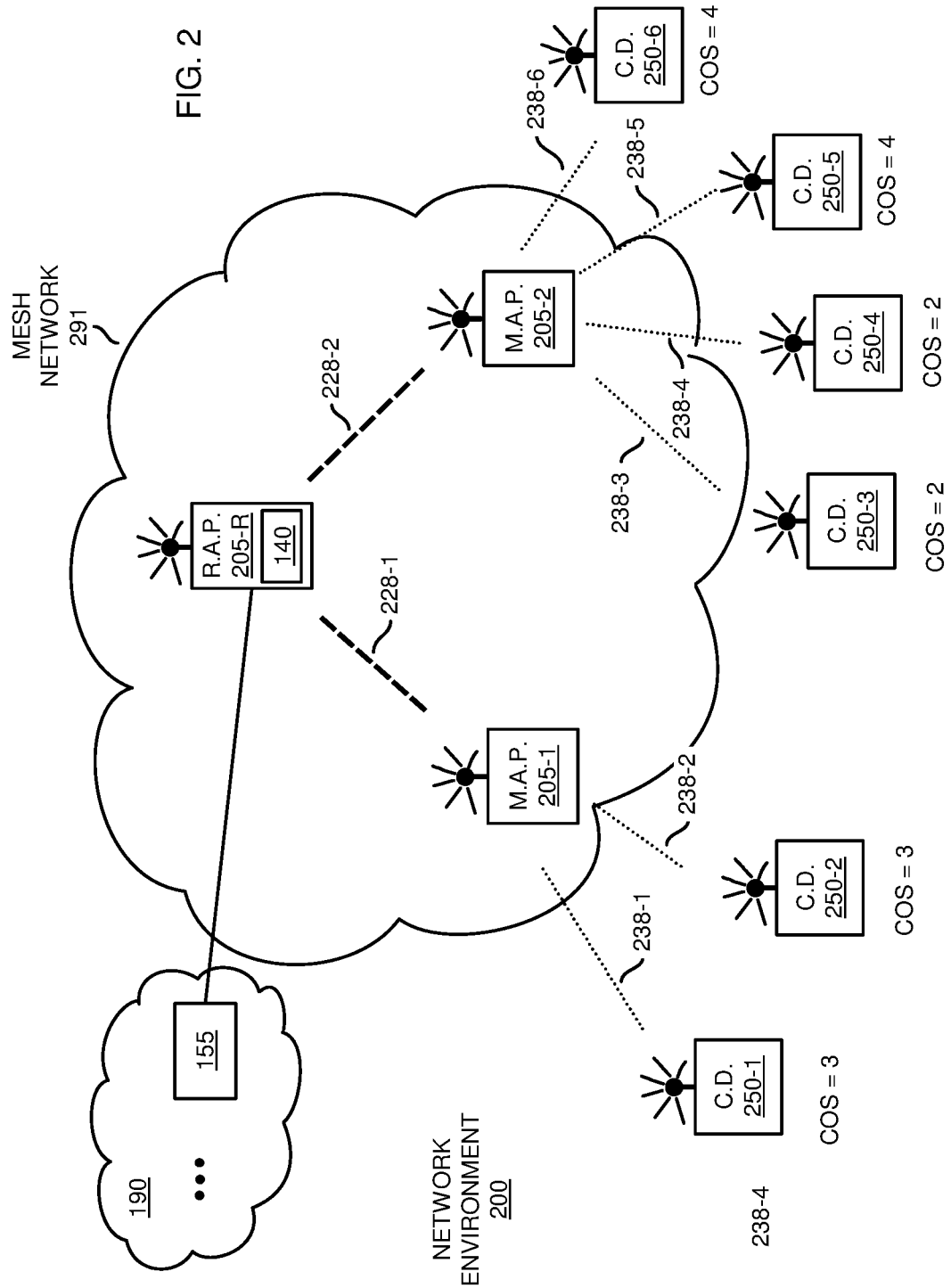
FIG. 2 is an example diagram illustrating a mesh network and allocation of bandwidth according to embodiments herein.

FIG. 2 is an example diagram illustrating a mesh network and allocation of bandwidth according to embodiments herein.

As shown, mesh network 291 of network environment 200 includes root access point 205-R, mesh access point 205-1 and mesh access point 205-2. Wireless communication link 228-1 supports communications between root access point 205-R and mesh access point 205-1. Wireless communication link 228-2 supports communications between root access point 205-R and mesh access point 205-2.

In this example, multiple computer devices 250-1 and 250-2 are communicatively coupled to mesh access point 205-1. Wireless communication link 238-1 supports communications between the computer device 250-1 and the mesh access point 205-1. Wireless communication link 238-2 supports communications between the computer device 250-2 and the mesh access point 205-1.

Further in this example, multiple computer devices 250-3, 250-4, 250-5 and 250-6 are communicatively coupled to mesh access point 205-2. Wireless communication link 238-3 supports communications between the computer device 250-3 and the mesh access point 205-2; wireless communication link 238-4 supports communications between the computer device 250-4 and the mesh access point 205-2; wireless communication link 238-5 supports communications between the computer device 250-5 and the mesh access point 205-2; wireless communication link 238-6 supports communications between the computer device 250-6 and the mesh access point 205-2; and so on.

Management resource 140 communicates with mesh access point 205-1 to obtain connectivity status information. In this example, the connectivity status information from mesh access point 205-1 (or other suitable resource) indicates that the computer device 250-1 and computer device 250-2 are both communicatively coupled to mesh access point 205-1.

As shown, each of the computer devices 250 can be assigned to a respective class of service (COS). Assume in this example that there are four possible classes of service such as class of service #1, class of service #2, class of service #3, and class of service #4. Each class can support a different downlink data rate.

For sake of simplicity and by way of a non-limiting example, assume that class of service #1 can support a downlink data rate of 10 megabits per second to a respective subscriber; class of service #2 can support a downlink data rate of 20 megabits per second to a respective subscriber; class of service #3 can support a downlink data rate of 30 megabits per second to a respective subscriber; and class of service #4 can support a downlink data rate of 40 megabits per second to a respective subscriber.

As previously discussed, the management resource 140 allocates use of wireless bandwidth available in mesh network 291 to wireless communication link 228-1 and wireless communication link 228-2 based on one or more parameters such as number of users, class of service, etc. The class of service information for each of the subscribers can be retrieved from any suitable resource. For example, the computer devices operated by the subscribers can be configured to provide the class of service information. Alternatively, the management resource 140 in the root access point 205-R can be configured to access settings from a remote server that stores the information.

In this non-limiting example, as shown, the subscriber at computer device 250-1 is assigned class of service #3; the subscriber at computer device 250-2 is assigned class of service #3. In this instance, the management resource 140 sums the required bandwidth (i.e., 30 megabits per second for computer device 250-1+30 megabits per second for computer device 250-2) to produce a value of 60 megabits per second. To facilitate communications to mesh access point 205-1, the management resource 140 allocates available wireless bandwidth to support a data rate of 60 megabits per second over wireless communication link 228-1.

Wireless communication link can represent one or more wireless channels allocated to support the throughput requirements of combined subscribers.

Further in this non-limiting example, the subscriber at computer device 250-3 is assigned class of service #2; the subscriber at computer device 250-4 is assigned class of service #2; the subscriber at computer device 250-5 is assigned class of service #4; the subscriber at computer device 250-6 is assigned class of service #4. In this instance, the management resource 140 sums the required bandwidth (i.e., 20 megabits per second+20 megabits per second+40 megabits per second+40 megabits per second) to produce a value of 120 megabits per second. That is, the combination of bandwidth requirements for computer devices 250-3, 250-4, 250-5, and 250-6 is 120 megabits per second. To facilitate communications to mesh access point 205-2, the management resource 140 allocates sufficient wireless bandwidth to support a data rate of 120 megabits per second over wireless communication link 228-2. Wireless communication link 228-2 can represent one or more wireless channels allocated to support the throughput requirements of combined subscribers.

Accordingly, embodiments herein can include obtaining a first downlink data rate assigned to a first client; obtaining a second downlink data rate assigned to a second client; summing the first downlink data rate and the second downlink data rate; and setting a magnitude of a given portion of the available wireless bandwidth in mesh network 291 to provide the first downlink data rate to the first client and the second downlink data rate to the second client.

Figure 3:
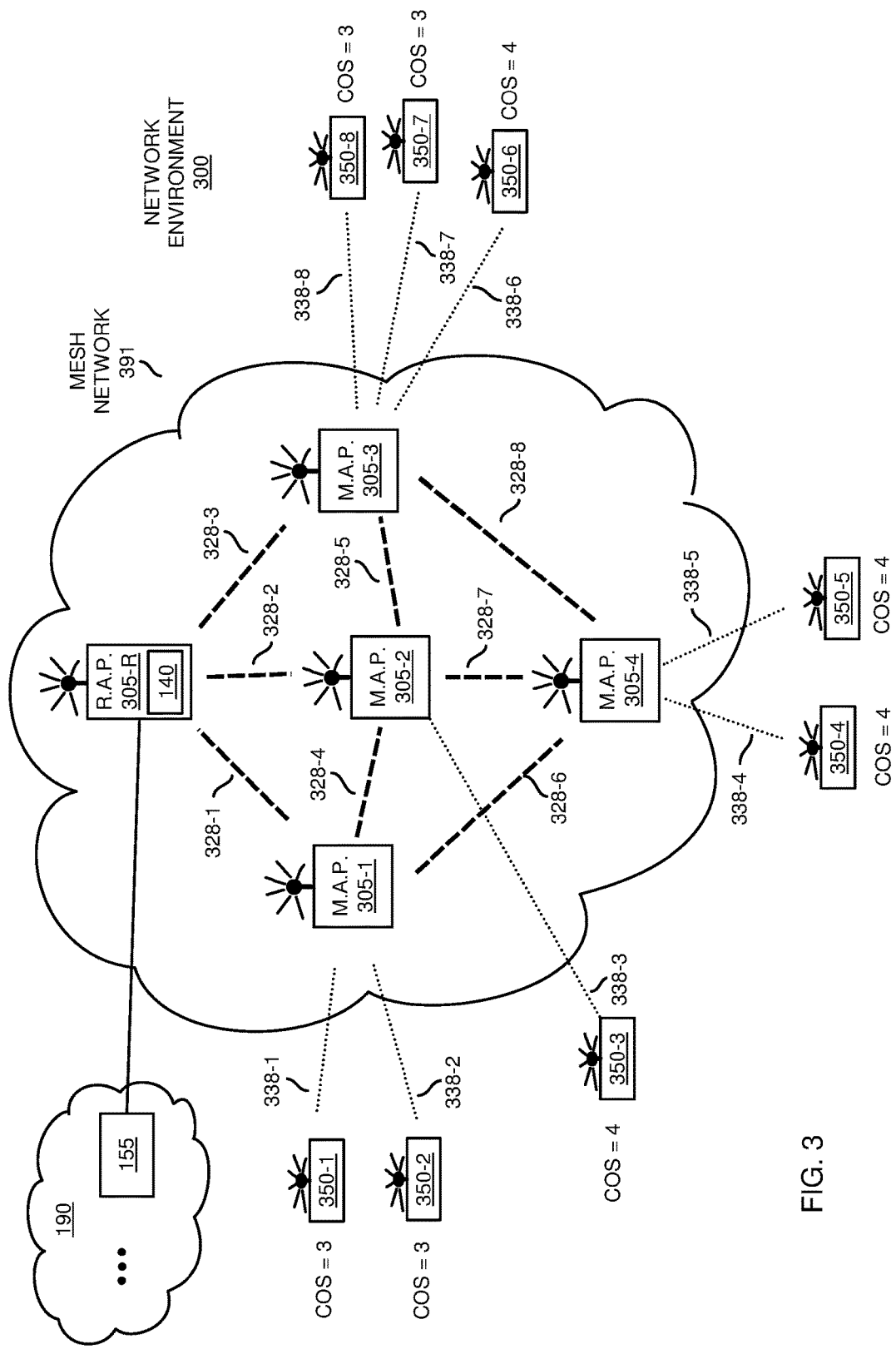
FIG. 3 is an example diagram illustrating a mesh network and allocation of bandwidth according to embodiments herein.

FIG. 3 is an example diagram illustrating a mesh network and allocation of bandwidth according to embodiments herein.

Wireless communication link 328-1 in mesh network 391 supports communications between root access point 305-R and mesh access point 305-1; wireless communication link 328-2 supports communications between root access point 305-R and mesh access point 305-2; wireless communication link 328-3 supports communications between root access point 305-R and mesh access point 305-3; wireless communication link 328-4 supports communications between mesh access point 305-1 and mesh access point 305-2; wireless communication link 328-5 supports communications between mesh access point 305-2 and mesh access point 305-3; wireless communication link 328-6 supports communications between mesh access point 305-1 and mesh access point 305-4; wireless communication link 328-7 supports communications between mesh access point 305-2 and mesh access point 305-4; wireless communication link 328-8 supports communications between mesh access point 305-3 and mesh access point 305-4.

In this example, multiple computer devices 350-1 and 350-2 are communicatively coupled to mesh access point 305-1. Wireless communication link 338-1 supports communications between the computer device 350-1 and the mesh access point 305-1. Wireless communication link 338-2 supports communications between the computer device 350-2 and the mesh access point 305-1.

Further in this example, computer device 350-3 is communicatively coupled to mesh access point 305-2. Wireless communication link 338-3 supports communications between the computer device 350-3 and the mesh access point 305-2.

Further in this example, multiple computer devices 350-4 and 350-5 are communicatively coupled to mesh access point 305-4. Wireless communication link 338-4 supports communications between the computer device 350-4 and the mesh access point 305-4. Wireless communication link 338-5 supports communications between the computer device 350-5 and the mesh access point 305-4.

Further in this example, multiple computer devices 350-6, 350-7 and 350-8 are communicatively coupled to mesh access point 305-3. Wireless communication link 338-6 supports communications between the computer device 350-6 and the mesh access point 305-3; wireless communication link 338-7 supports communications between the computer device 350-7 and the mesh access point 305-3; wireless communication link 338-8 supports communications between the computer device 350-8 and the mesh access point 305-3.

Management resource 140 communicates with mesh access points 305 (or other suitable resource) to obtain connectivity status information. In this example, the received connectivity status information from mesh access point 305-1 (or other suitable resource) indicates that the computer device 350-1 and computer device 350-2 are both communicatively coupled to mesh access point 305-1; received connectivity status information from mesh access point 305-2 (or other suitable resource) indicates that the computer device 350-3 is communicatively coupled to mesh access point 305-2; the received connectivity status information from mesh access point 305-4 (or other suitable resource) indicates that the computer device 350-4 and computer device 350-5 are both communicatively coupled to mesh access point 305-4; the received connectivity status information from mesh access point 305-3 (or other suitable resource) indicates that the computer devices 350-6, 350-7, and 350-8 are communicatively coupled to mesh access point 305-3.

As shown, each of the computer devices 350 is assigned to a respective class of service. Assume in this example that there are four possible classes of service such as class of service #1, class of service #2, class of service #3, and class of service #4. Each class can support a different downlink data rate.

For sake of simplicity and by way of a non-limiting example, class of service #1 can support a downlink data rate of 10 megabits per second to a respective subscriber; class of service #2 can support a downlink data rate of 20 megabits per second to a respective subscriber; class of service #3 can support a downlink data rate of 30 megabits per second to a respective subscriber; and class of service #4 can support a downlink data rate of 40 megabits per second to a respective subscriber.

As previously discussed, the management resource 140 allocates use of wireless bandwidth available in mesh network 391 to wireless communication links 328 based on one or more parameters such as number of users, class of service, etc.

The class of service information for each of the subscribers and corresponding computer devices can be retrieved from any suitable resource. For example, the computer devices operated by the subscribers can be configured to provide the class of service information. Alternatively, the management resource 140 in the root access point 305-R can be configured to access settings from a remote server that stores the information.

In this non-limiting example, as shown, the subscriber at computer device 350-1 is assigned class of service #3; the subscriber at computer device 350-2 is assigned class of service #3. In this instance, the management resource 140 sums the required bandwidth (i.e., 30 megabits per second for computer device 350-1+30 megabits per second for computer device 350-2) to produce a value of 60 megabits per second. To facilitate communications to mesh access point 305-1, the management resource 140 allocates sufficient wireless bandwidth in mesh network 391 to support a data rate of 60 megabits per second over wireless communication link 328-1.

Further in this non-limiting example, the subscriber at computer device 350-3 is assigned class of service #4; the subscriber at computer device 350-4 is assigned class of service #4; the subscriber at computer device 350-5 is assigned class of service #4; the subscriber at computer device 350-6 is assigned class of service #4; the subscriber at computer device 350-7 is assigned class of service #3; the subscriber at computer device 350-8 is assigned class of service #3.

In this example embodiment, the management resource 140 allocates available wireless bandwidth based on the subscribers' class of service settings. Assume that the root access point 305-R has a sufficient wireless bandwidth available to wirelessly transmit at a downlink data rate of 280 megabits per second.

To facilitate assigned data rates, the management resource 140 allocates sufficient wireless bandwidth from root access point 305-R to wireless communication link 328-1 to transmit 60 megabits per second of data to mesh access point 305-1. Mesh access point 305-1 supports a 30 megabits per second data rate over wireless communication link 338-1 to computer device 350-1. Mesh access point 305-1 supports a 30 megabits per second data rate over wireless communication link 338-2 to computer device 350-2.

Assume in this example that the management resource 140 allocates available wireless bandwidth on wireless communication link 328-2 and 328-7 to support communications to computer device 350-3, computer device 350-4, and computer device 350-5. Each of computer devices 350-3, 350-4, and 350-5 require data rates of 40 megabits per second. To accommodate such data rates, the management resource 140 allocates sufficient wireless bandwidth to support 80 megabits per second (40+40 megabits per second) over wireless communication link 328-7.

In addition to being a pass-through device in which wireless communications are forwarded over wireless communication link 328-7 to computer devices 350-4 and 350-5, the mesh access point 305-2 supports forwarding of communications to computer device 350-3 over wireless communication link 338-3. In such an instance, to accommodate communications to a combination of the computer devices 350-3, 350-4, and 350-5, the management resource 140 allocates sufficient wireless bandwidth to support a data rate of 120 megabits per second over wireless communication link 328-2.

Lastly, a combination of the computer devices 350-6, 350-7, and 350-8 requires a data rate of 100 megabits per second (e.g., 30+30+40). The management resource 140 allocates appropriate bandwidth to wireless communication link 328-3 to support the combined data rate requirement of 100 megabits per second.

In one embodiment, the management resource 140 occasionally or periodically reassesses the current wireless bandwidth allocations in mesh network 391 to adjust current allocations. The current allocations may be static for some amount of time before they need to be changed. For example, the management resource 140 can configure the allocation of wireless bandwidth as discussed above. After several minutes, or passage of some amount of time, the management resource 140 can update the allocation of bandwidth to different values to account for changing conditions such as a failure, increased number of subscribers using a particular mesh access point, etc.

In the above example of setting bandwidth, note that the wireless communication links 328-4, 328-5, 328-6, and 328-8 are not allocated any wireless bandwidth. Note however that the management resource 140 may receive notification that the wireless communication link 328-7 is unable to support robust communications. In other words, the wireless communication link 328-7 may be prone to communication failures. In such an instance, the management resource 140 can dynamically adjust the allocation of bandwidth.

For example, in response to detecting that the wireless communication link 328-7 performs poorly, the management resource 140 can be configured to reallocate wireless bandwidth to wireless communication links 328-1, 328-2, and 328-6.

For example, wireless communication link 328-1 can be assigned wireless bandwidth to support a data rate of 140 megabits per second; wireless communication link 328-2 can be assigned wireless bandwidth to support a data rate of 40 megabits per second; wireless communication link 328-3 can be assigned wireless bandwidth to support a data rate of 100 megabits per second; wireless communication link 328-4 can be assigned wireless bandwidth to support a data rate of 0 megabits per second; wireless communication link 328-5 can be assigned wireless bandwidth to support a data rate of 0 megabits per second; wireless communication link 328-6 can be assigned wireless bandwidth to support a data rate of 80 megabits per second; wireless communication link 328-7 can be assigned wireless bandwidth to support a data rate of 0 megabits per second; and wireless communication link 328-8 can be assigned wireless bandwidth to support a data rate of 0 megabits per second.

As another example, in response to detecting that the wireless communication link 328-6 performs poorly, the management resource 140 can be configured to reallocate wireless bandwidth to wireless communication links 328-8. For example, wireless communication link 328-1 can be assigned wireless bandwidth to support a data rate of 60 megabits per second; wireless communication link 328-2 can be assigned wireless bandwidth to support a data rate of 40 megabits per second; wireless communication link 328-3 can be assigned wireless bandwidth to support a data rate of 180 megabits per second; wireless communication link 328-4 can be assigned wireless bandwidth to support a data rate of 0 megabits per second; wireless communication link 328-5 can be assigned wireless bandwidth to support a data rate of 0 megabits per second; wireless communication link 328-6 can be assigned wireless bandwidth to support a data rate of 0 megabits per second; wireless communication link 328-7 can be assigned wireless bandwidth to support a data rate of 0 megabits per second; and wireless communication link 328-8 can be assigned wireless bandwidth to support a data rate of 80 megabits per second.

In this manner, the management resource can dynamically adjust the wireless bandwidth available in mesh network 391 such that the distribution of data to the computer devices is fair.

It is possible that the root access point 305-R is unable to provide a combined downlink data rate output equal to 280 megabits per second. In other words, there may be so many users or so much interference that the downlink through mesh network 391 becomes saturated and only supports half the bandwidth such as 140 megabits per second. In such an instance, the management resource can be configured to proportionally adjacent allocation of wireless bandwidth in mesh network 391 such that each of the subscribers is allocated a portion (e.g., half) of their original assigned class of service data rate. For example, the management resource 140 can be configured to assign wireless communication link 328-1 wireless bandwidth to support a data rate of 30 megabits per second (each of computer devices 350-1 and 350-2 would be allocated 15 megabits per second); wireless communication link 328-2 can be assigned wireless bandwidth to support a data rate of 20 megabits per second (for computer device 350-3); wireless communication link 328-3 can be assigned wireless bandwidth to support a data rate of 50 megabits per second; wireless communication link 328-4 can be assigned wireless bandwidth to support a data rate of 0 megabits per second; wireless communication link 328-5 can be assigned wireless bandwidth to support a data rate of 0 megabits per second; wireless communication link 328-6 can be assigned wireless bandwidth to support a data rate of 0 megabits per second; wireless communication link 328-7 can be assigned wireless bandwidth to support a data rate of 0 megabits per second; and wireless communication link 328-8 can be assigned wireless bandwidth to support a data rate of 40 megabits per second (each of computer devices 350-4 and 350-5 would be allocated 20 megabits per second).

Thus, the available wireless bandwidth allocated to communicate with respective mesh access points 305 in mesh network 391 can vary.

As previously discussed, example mesh network 391 of network environment 300 includes root access point 305-R, mesh access point 305-1, mesh access point 305-2, mesh access point 305-3, and mesh access point 305-4. In one embodiment, the management resource 140 utilizes a map of the mesh network 391 (indicating interconnectivity of access points) to identify which of the mesh access points lie in a corresponding communication path between the root access point 305-R and another terminal mesh access point in a sequence. In response to detecting that communications to one or more client devices (such as computer devices 350-4 and 350-5) must pass through a communication path including a mesh access point 305-2 and another access point such as mesh access point 305-4, as mentioned above, the management resource 140 produces a summation value to account for communications through mesh access point 305-2 to computer device 350-3 as well as communications through mesh access point 305-2 to mesh access point 305-4.

In accordance with another example embodiment, assume that the root access point 305-R is able to support more than 280 megabits per second on the downlink through mesh network 391. The management resource 140 can be configured to split the bandwidth to computer devices 350-4 and 350-5 amongst multiple paths in mesh network 391 instead of through a single mesh access point path as discussed above.

More specifically, in one embodiment, the management resource 140 assigns wireless communication link 328-1 wireless bandwidth to support a data rate of 100 megabits per second (60 megabits per second for computer devices 350-1 and 350-2 plus 40 megabits per second for computer device 350-4); wireless communication link 328-6 can be assigned wireless bandwidth to support a data rate of 40 megabits per second to mesh access point 305-4; wireless communication link 328-2 can be assigned wireless bandwidth to support a data rate of 80 megabits per second (40 megabits per second for computer device 350-3 and 40 megabits per second for computer device 350-5); wireless communication link 328-7 can be assigned wireless bandwidth to support a data rate of 40 megabits per second; wireless communication link 328-3 can be assigned wireless bandwidth to support a data rate of 100 megabits per second (for computer devices 350-6, 350-7, and 350-8); wireless communication link 328-4 can be assigned wireless bandwidth to support a data rate of 0 megabits per second; wireless communication link 328-5 can be assigned wireless bandwidth to support a data rate of 0 megabits per second; and wireless communication link 328-8 can be assigned wireless bandwidth to support a data rate of 0 megabits per second. Accordingly, the wireless bandwidth in mesh network 391 allocated to support communications to a mesh access point more than one hop away from the root access point 305-R can be split through multiple mesh access points. For example, mesh access point 305-4 receives 40 megabits per second of bandwidth from mesh access point 305-1 and 40 megabits per second from mesh access point 305-2.

In accordance with such an embodiment, when forwarding communications through mesh network 391 to the computer devices 350-4 and 350-5, the root access point 305-R can be configured to include a forwarding table indicating that messages addressed to the computer device 350-4 are to be sent over a portion of wireless communication link 328-1 to mesh access point 305-1; mesh access point 305-1 uses its own forwarding table to forward received messages addressed to computer device 350-4 to mesh access point 305-4. The root access point 305-R can be configured to include a forwarding table indicating that messages addressed to the computer device 350-5 are to be sent over a portion of the wireless communication link 328-2 to mesh access point 305-2; mesh access point 305-2 uses its own forwarding table to forward the received message through mesh access point 305-4 to computer device 350-5. Thus, allocated wireless bandwidth in mesh network 391 can be earmarked for use by particular computer devices.

As an alternative, the use of allocated bandwidth in mesh network 391 can be more flexible. For example, the forwarding table in root access point 305-R can indicate that any messages addressed to computer devices 350-4 and 350-5 can be sent through either mesh access point 305-1 and 305-2. For example, the root access point 305-R can be configured to transmit messages (to either of computer devices 350-4 and 350-5) over a portion (e.g., 40 megabits per second) of the bandwidth allocated to wireless communication link 328-1. In such an instance, mesh access point 305-1 can include a forwarding table indicating that any received messages addressed to computer devices 350-4 and 350-5 are to be forwarded through mesh access point 305-4 to the respective destination devices; mesh access point 305-2 can include a forwarding table indicating that any received messages addressed to computer devices 350-4 and 350-5 are to be forwarded through mesh access point 305-4 to the respective destination devices. The root access point 305-R can be configured to choose amongst the multiple available paths to communicate messages through mesh network 391 to the target devices based on one or more parameters such as congestion, health of a respective channel, bit error rate of a channel, signal to noise ratio of a channel, etc.

Figure 4:
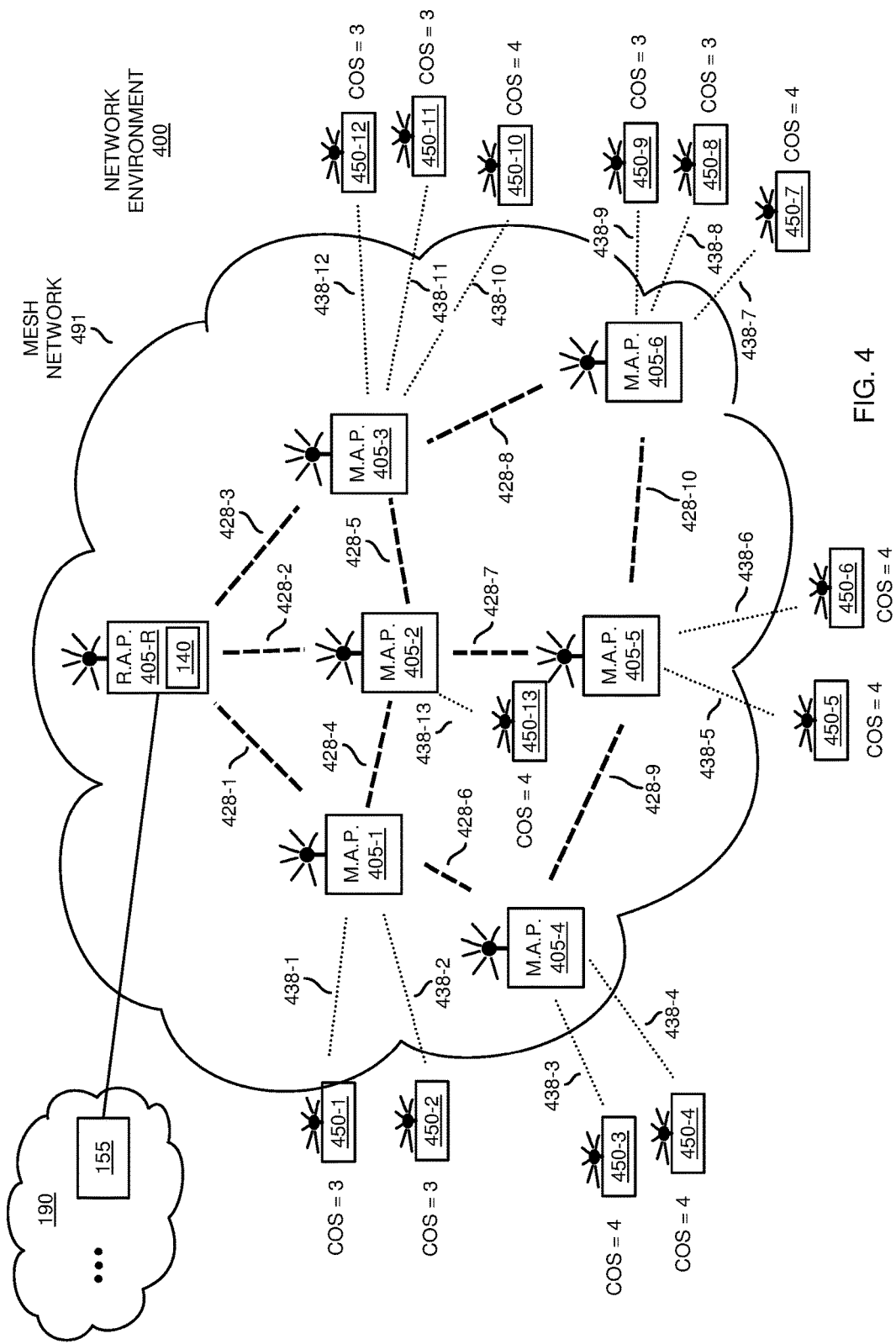
FIG. 4 is an example diagram illustrating a mesh network and allocation of bandwidth according to embodiments herein.

FIG. 4 is an example diagram illustrating a mesh network and fair allocation of wireless bandwidth in a mesh network environment according to embodiments herein.

As shown, example mesh network 491 of network environment 400 includes root access point 405-R, mesh access point 405-1, mesh access point 405-2, mesh access point 405-3, mesh access point 405-4, mesh access point 405-5, and mesh access point 405-6.

Wireless communication link 428-1 in mesh network 491 supports communications between root access point 405-R and mesh access point 405-1; wireless communication link 428-2 supports communications between root access point 405-R and mesh access point 405-2; wireless communication link 428-3 supports communications between root access point 405-R and mesh access point 405-3; wireless communication link 428-4 supports communications between mesh access point 405-1 and mesh access point 405-2; wireless communication link 428-5 supports communications between mesh access point 405-2 and mesh access point 405-3; wireless communication link 428-6 supports communications between mesh access point 405-1 and mesh access point 405-4; wireless communication link 428-7 supports communications between mesh access point 405-2 and mesh access point 405-5; wireless communication link 428-8 supports communications between mesh access point 405-3 and mesh access point 405-6; wireless communication link 428-9 supports communications between mesh access point 405-4 and mesh access point 405-5; wireless communication link 428-10 supports communications between mesh access point 405-5 and mesh access point 405-6.

Further in this example, multiple computer devices 450-1 and 450-2 are communicatively coupled to mesh access point 405-1. Wireless communication link 438-1 supports communications between the computer device 450-1 and the mesh access point 405-1. Wireless communication link 438-2 supports communications between the computer device 450-2 and the mesh access point 405-1.

Computer device 450-13 is communicatively coupled to mesh access point 405-2. Wireless communication link 438-13 supports communications between the computer device 450-13 and the mesh access point 405-2.

Multiple computer devices 450-3 and 450-4 are communicatively coupled to mesh access point 405-4. Wireless communication link 438-3 supports communications between the computer device 450-3 and the mesh access point 405-4. Wireless communication link 438-4 supports communications between the computer device 450-4 and the mesh access point 405-4.

Multiple computer devices 450-5 and 450-6 are communicatively coupled to mesh access point 405-5. Wireless communication link 438-5 supports communications between the computer device 450-5 and the mesh access point 405-5. Wireless communication link 438-6 supports communications between the computer device 450-6 and the mesh access point 405-5.

Multiple computer devices 450-7, 450-8 and 450-9 are communicatively coupled to mesh access point 405-6. Wireless communication link 438-7 supports communications between the computer device 450-7 and the mesh access point 405-6; wireless communication link 438-8 supports communications between the computer device 450-8 and the mesh access point 405-6; wireless communication link 438-9 supports communications between the computer device 450-9 and the mesh access point 405-6.

Multiple computer devices 450-10, 450-11 and 450-12 are communicatively coupled to mesh access point 405-3. Wireless communication link 438-10 supports communications between the computer device 450-10 and the mesh access point 405-3; wireless communication link 438-11 supports communications between the computer device 450-11 and the mesh access point 405-3; wireless communication link 438-12 supports communications between the computer device 450-12 and the mesh access point 405-3.

Assume in this example that the root access point 405-R supports 230 megabits per second of throughput on a downlink through mesh network to respective computer devices. The summation of data rates assigned to the subscribers is 460 megabits per second (e.g., 30+30+40+40+40+40+40+30+40+30+40+30+40).

To achieve fairness amongst users, each of the mesh access points is allocated sufficient wireless bandwidth to support half their assigned bandwidth rate. For example, the management resource 140 assigns wireless communication link 428-1 sufficient wireless bandwidth to support a combined data rate of 70 megabits per second from root access point 405-R to mesh access point 405-1; the management resource 140 assigns wireless communication link 428-6 sufficient wireless bandwidth to support a combined data rate of 40 megabits per second from mesh access point 405-1 to mesh access point 405-4; the management resource 140 assigns wireless communication link 428-2 sufficient wireless bandwidth to support a combined data rate of 60 megabits per second from root access point 405-R to mesh access point 405-2; the management resource 140 assigns wireless communication link 428-7 sufficient wireless bandwidth to support a combined data rate of 40 megabits per second between mesh access point 405-2 and mesh access point 405-5; the management resource 140 assigns wireless communication link 428-3 sufficient wireless bandwidth to support a combined data rate of 100 megabits per second from root access point 405-R to mesh access point 405-3; the management resource 140 assigns wireless communication link 428-8 sufficient wireless bandwidth to support a combined data rate of 50 megabits per second between mesh access point 405-3 and mesh access point 405-6.

Note that the wireless bandwidth in mesh network 491 can be allocated in a similar manner to support fairness of transmitting data on the uplink from mesh access points to root access point 405-R.

Figure 5:
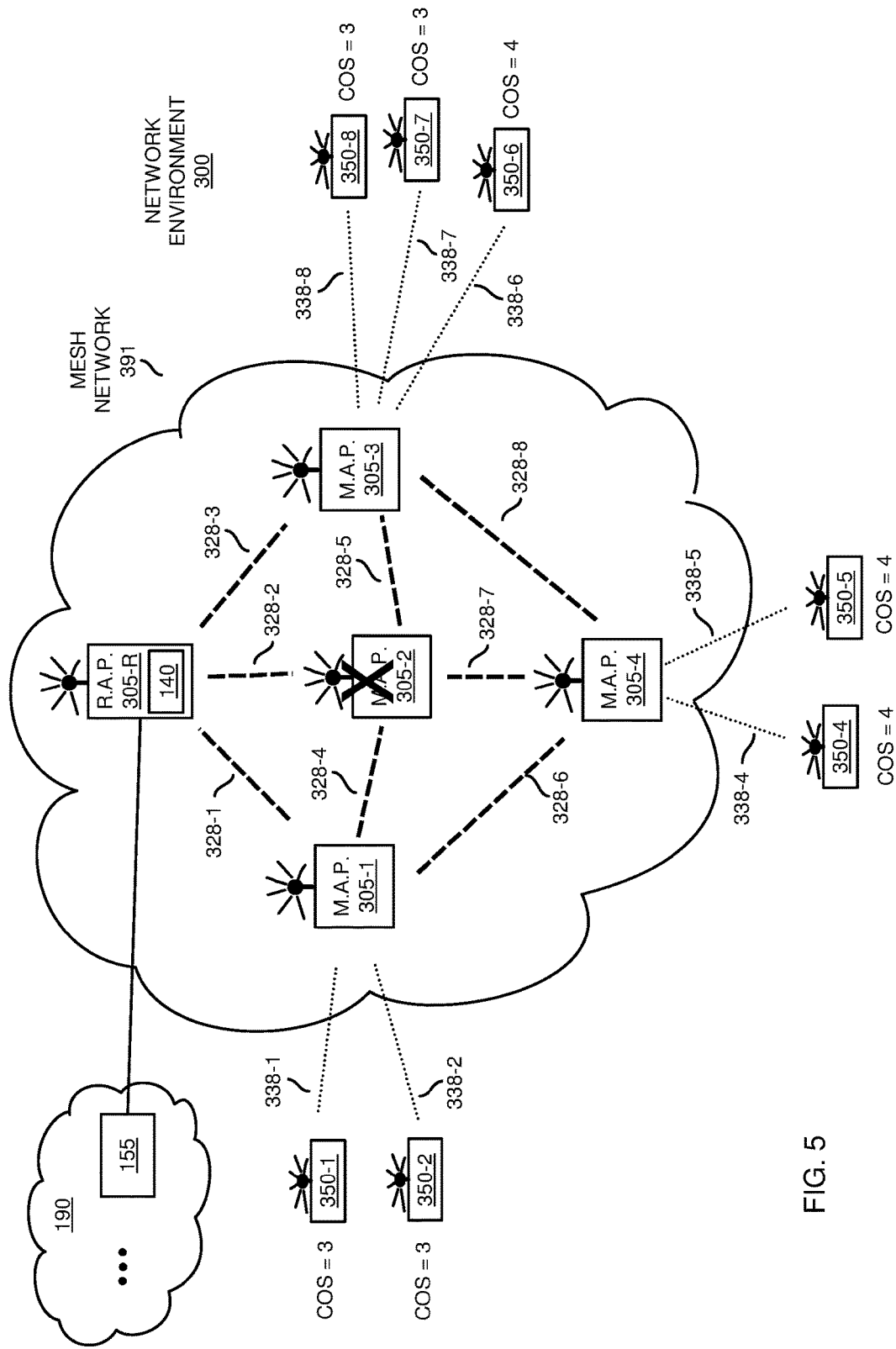
FIG. 5 is an example diagram illustrating a mesh network and failure of a mesh network access point according to embodiments herein.

FIG. 5 is an example diagram illustrating a mesh network and failure of a mesh network access point according to embodiments herein.

Assume in this example that the root access point 305-R supports at least 250 megabits per second of data rate throughput on a downlink through mesh network to respective computer devices.

Assume further in this example that, prior to the failure of mesh access point 305-2, the management resource 140 assigns wireless communication link 328-1 sufficient wireless bandwidth to support a data rate of 60 megabits per second from root access point 305-R to mesh access point 305-1; the management resource 140 assigns wireless communication link 328-6 no wireless bandwidth; the management resource 140 assigns wireless communication link 328-2 sufficient wireless bandwidth to support a combined data rate of 80 megabits per second from root access point 305-R to mesh access point 305-2; the management resource 140 assigns wireless communication link 328-7 sufficient wireless bandwidth to support a combined data rate of 80 megabits per second between mesh access point 305-2 and mesh access point 305-4; the management resource 140 assigns wireless communication link 328-3 sufficient wireless bandwidth to support a combined data rate of 100 megabits per second from root access point 305-R to mesh access point 305-3; the management resource 140 assigns the wireless communication link 328-8 no wireless bandwidth.

As shown, mesh access point 305-2 experiences a fault condition and is unable to convey communications. The management resource 140 receives notification of the fault condition associated with mesh access point 305-2 in the mesh network 391. The fault condition can indicate a failed wireless communication link, a failed mesh access point, etc.

In response to notice of the fault condition associated with mesh access point 305-2, the management resource 140 adjusts a magnitude of the portions of the wireless bandwidth in mesh network 391 allocated to the multiple interconnected access points to circumvent a physical location where the fault condition occurs.

Figure 6:
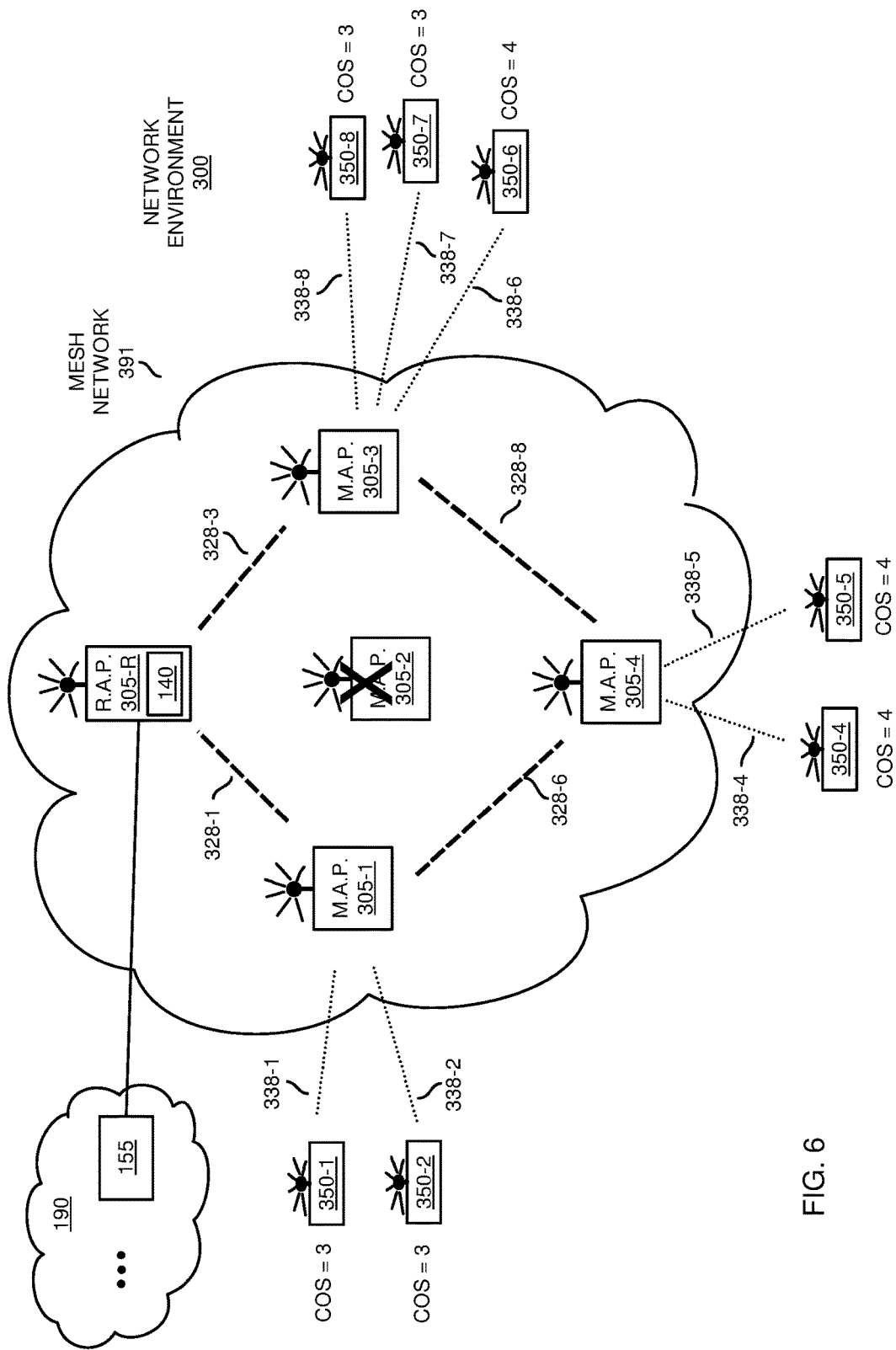
FIG. 6 is an example diagram illustrating a mesh network and reallocation of bandwidth according to embodiments herein.

More specifically, as shown in FIG. 6, the management resource 140 assigns wireless communication link 328-1 sufficient wireless bandwidth to support a data rate of 140 megabits per second from root access point 305-R to mesh access point 305-1; the management resource 140 assigns wireless communication link 328-6 sufficient wireless bandwidth to support a data rate of 80 megabits per second from mesh access point 305-1 to mesh access point 305-4; the management resource 140 assigns wireless communication link 328-3 sufficient wireless bandwidth to support a combined data rate of 100 megabits per second from root access point 305-R to mesh access point 305-3; the management resource 140 assigns the wireless communication link 328-8 no wireless bandwidth. Thus, even during a failure, mesh network 391 can be used to deliver data to subscribers.

Assume in this example that another computer device and corresponding user having a class of service of #4 establishes a wireless communication link between itself and mesh access point 305-4. In such an instance, in response to detecting the new client, the management resource 140 reallocates use of wireless bandwidth in mesh network 391.

For example, to accommodate the new computer device, the management resource 140 assigns wireless communication link 328-1 sufficient wireless bandwidth to support a data rate of 140 megabits per second from root access point 305-R to mesh access point 305-1; the management resource 140 assigns wireless communication link 328-6 sufficient wireless bandwidth to support a data rate of 80 megabits per second from mesh access point 305-1 to mesh access point 305-4; the management resource 140 assigns wireless communication link 328-3 sufficient wireless bandwidth to support a combined data rate of 140 megabits per second from root access point 305-R to mesh access point 305-3; the management resource 140 assigns the wireless communication link 328-8 sufficient wireless bandwidth to support a data rate of 40 megabits per second between mesh access point 305-3 and mesh access point 305-4. Thus, embodiments herein can include adjusting an allocation of wireless bandwidth in the mesh network 391 in response to detecting a change in the number of clients communicatively coupled to any of the mesh access points.

As discussed herein, each mesh access point is allocated use of available wireless bandwidth in mesh network 391 to support communications with respective clients depending on how many clients the respective mesh access point services. For example, in one embodiment, the management resource 140 assigns sufficient wireless bandwidth to support a data rate of 60 megabits per second between root access point 305-R and mesh access point 305-1 to support communications with computer devices 350-1 and 350-2; the management resource 140 assigns sufficient wireless bandwidth to support a data rate of 80 megabits per second between root access point 305-R and mesh access point 305-4 (through mesh access point 305-1) to support communications with computer devices 350-4 and 350-5; the management resource 140 assigns sufficient wireless bandwidth to support a data rate of 100 megabits per second between root access point 305-R and mesh access point 305-3 to support communications with computer devices 350-6, 350-7, and 350-8; the management resource 140 assigns sufficient with bandwidth to support a data rate of 40 megabits per second between root access point 305-R and mesh access point 305-4 (through mesh access point 305-3) for the new client.

Figure 7:
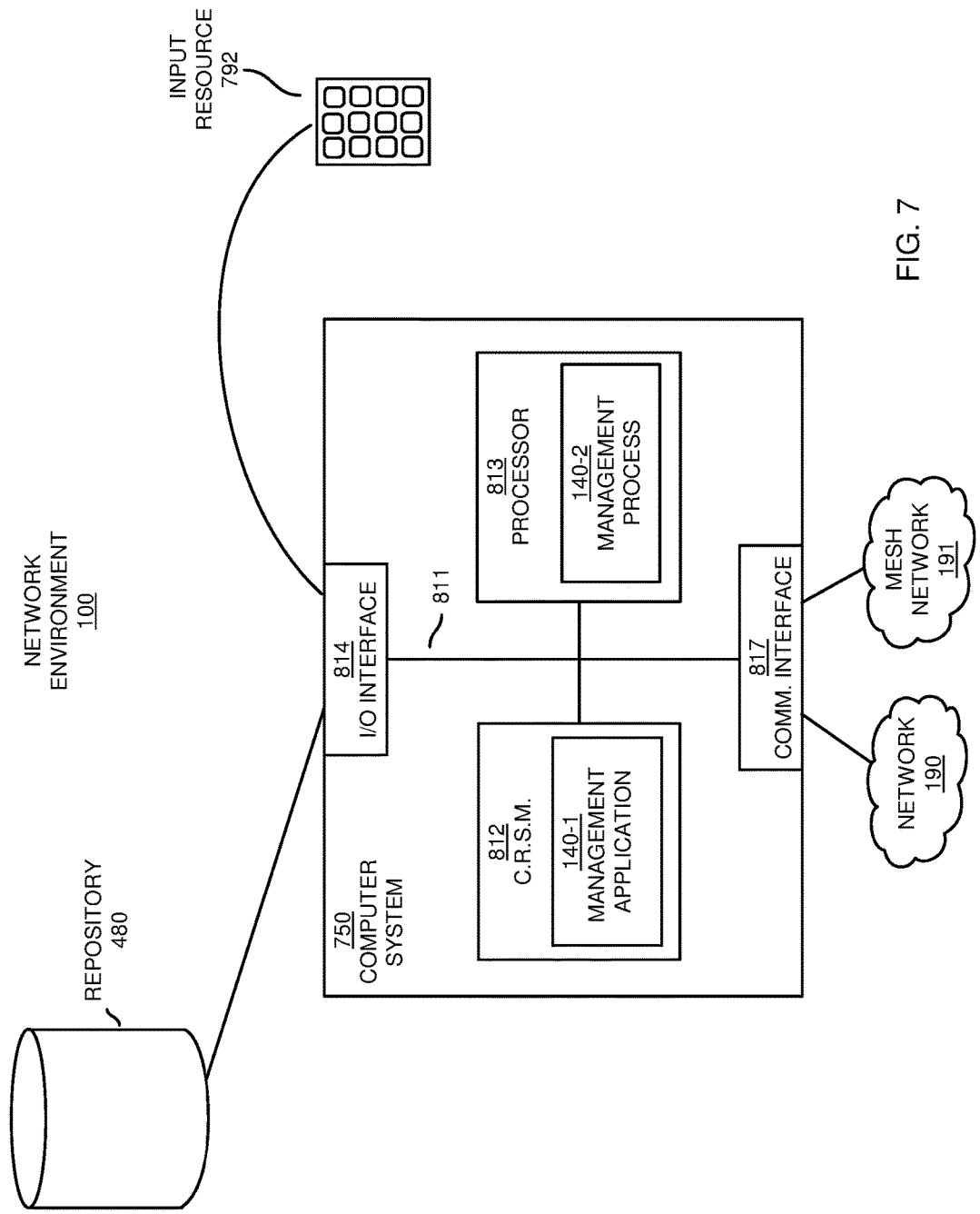
FIG. 7 is a diagram illustrating an example computer architecture in which to execute any of the functionality according to embodiments herein.

FIG. 7 is an example block diagram of a computer device for implementing any of the operations as discussed herein according to embodiments herein.

As shown, computer system 750 such as a root access point (or other suitable resource) of the present example can include an interconnect 811 that couples computer readable storage media 812 such as a non-transitory type of media (i.e., any type of hardware storage medium) in which digital information can be stored and retrieved, a processor 813 (e.g., one or more processor devices of hardware), I/O interface 814, and a communications interface 817.

I/O interface 814 provides connectivity to a repository 480 and, if present, other devices such as a playback device, display screen, keypad (input resource 792), a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from remote sources and communicate with other computers. Communications interface 817 also enables the computer system 750 and processor 813 to communicate with one or more access points in mesh network 191. I/O interface 814 enables processor 813 to retrieve stored information from repository 480.

As shown, computer readable storage media 812 is encoded with management application 140-1 (e.g., software, firmware, etc.) executed by processor 813. Management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor 813. In other words, the management process 140-2 associated with processor 813 represents one or more aspects of executing management application 140-1 within or upon the processor 813 in the computer system 750.

Those skilled in the art will understand that the computer system 750 can include other processes and/or software and hardware components, such as an operating system that controls allocation and use of hardware resources to execute management application 140-1.

In accordance with different embodiments, note that computer system may be any of various types of devices, including, but not limited to, a root access point, computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Functionality supported by the different resources will now be discussed via flowcharts in FIGS. 8-9. Note that the steps in the flowcharts below can be executed in any suitable order.

Figure 8:
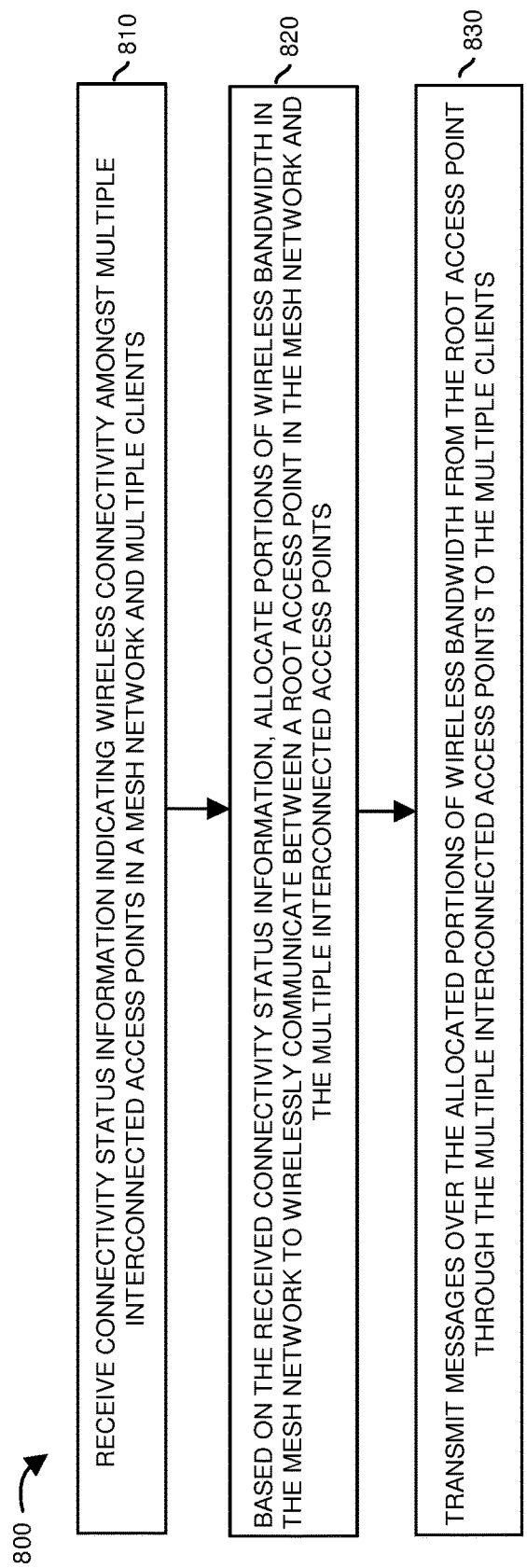
FIGS. 8-9 are example diagrams illustrating different methods according to embodiments herein.

FIG. 8 is a flowchart 800 illustrating an example method according to embodiments. Note that there will be some overlap with respect to concepts as discussed above.

In processing block 810, and in view of FIG. 1, the root access point 105-R receives connectivity status information indicating wireless connectivity amongst multiple interconnected access points 105 in mesh network 191 and multiple computer devices 150 such as clients.

In processing block 820, based on the received connectivity status information, the root access point 105-R allocates portions of wireless bandwidth in the mesh network 191 to wirelessly communicate between a root access point 105-R in the mesh network 191 and the multiple interconnected access points 105.

In processing block 830, the root access point 105-R transmits messages over the allocated portions of wireless bandwidth from the root access point 105-R through the multiple interconnected access points 105 to the multiple computer devices 150 such as clients.

Figure 9:
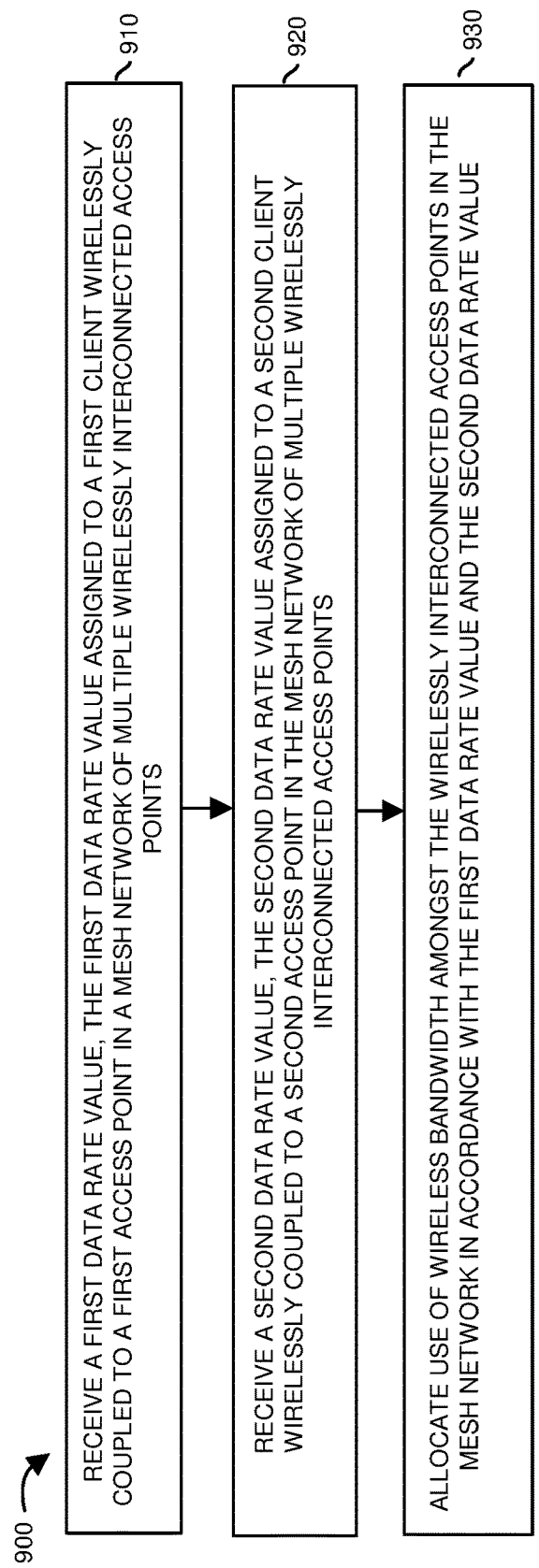

FIG. 9 is a flowchart 900 illustrating an example method according to embodiments. Note that there will be some overlap with respect to concepts as discussed above.

In processing block 910, and in view of FIG. 1, the root access point 105-R receives a first data rate value. The first data rate value is assigned to a first client (e.g., user 108-4) wirelessly coupled to a first access point 105-2 in a mesh network 191 of multiple wirelessly interconnected access points 105.

In processing block 920, the root access point 105-R receives a second data rate value. The second data rate value is assigned to a second client such as user 108-1 wirelessly coupled to a second access point 105-5 in the mesh network 191 of multiple wirelessly interconnected access points 105.

In processing block 930, the root access point 105-R allocates use of wireless bandwidth amongst the wirelessly interconnected access points in the mesh network 191 in accordance with the first data rate value and the second data rate value.

Note again that techniques herein are well suited for managing one or more resources such as access points in a mesh network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    establishing wireless connectivity amongst multiple interconnected access points in a mesh network, the mesh network providing multiple communication devices access to a remote network;
    identifying a service class assigned to a first communication device of the multiple communication devices; and
    in accordance with the service class assigned to the first communication device, controlling use of wireless bandwidth in the mesh network to provide the first communication device access to the remote network at a data rate as specified by the service class.

2. The method as in claim 1, wherein controlling use of wireless bandwidth in the mesh network includes: allocating a portion of bandwidth on a first wireless link and a portion of bandwidth on a second wireless link in the mesh network to convey communications between the remote network and the first communication device.

3. The method as in claim 1, wherein establishing the wireless connectivity amongst the multiple interconnected access points includes:
    establishing a first wireless link between a root access point of the mesh network and a first wireless access point in the mesh network, the root access point communicatively coupling the mesh network to the remote network; and
    allocating a first portion of bandwidth in the first wireless link to convey communications from the root access point to the first communication device.

4. The method as in claim 3, wherein the allocated first portion of bandwidth in the first wireless link supports conveyance of the communications at the data rate as specified by the service class assigned to the communication device.

5. The method as in claim 4, wherein the communications are first communications; and
wherein controlling use of the bandwidth includes: allocating a second portion of bandwidth in the first wireless link to convey second communications from the root access point to a second communication device, the second portion of bandwidth in the first wireless link supporting conveyance of the second communications at a data rate as specified by a service class assigned to the second communication device.

6. The method as in claim 1, wherein establishing the wireless connectivity amongst the multiple interconnected access points includes:
establishing a first wireless link between a root access point of the mesh network and a first wireless access point in the mesh network, the root access point coupling the mesh network to the remote network; and
establishing a second wireless link between the first wireless access point and a second wireless access point of the mesh network, the first communication device in wireless communication with the second wireless access point.

7. The method as in claim 6, wherein controlling use of wireless bandwidth includes:
establishing a first communication path in the mesh network, the first communication path extending from the root access point to the first communication device, the first communication path including a first portion of bandwidth allocated from the first wireless link and a first portion of bandwidth from the second wireless link.

8. The method as in claim 7 further comprising:
receiving first communications at the root access point;
transmitting the first communications from the root access point over the first portion of bandwidth of the first wireless link to the first access point; and
transmitting the first communications from the first access point over the first portion of bandwidth of the second wireless link to the second access point; and
transmitting the first communications from the second access point over a third wireless link to the first communication device.

9. The method as in claim 8, wherein controlling use of the wireless bandwidth further includes:
establishing a second communication path in the mesh network, the second communication path extending from the root access point to a second communication device, the second communication path including a second portion of bandwidth allocated from the first wireless link and a second portion of bandwidth from the second wireless link.

10. The method as in claim 9 further comprising:
receiving second communications at the root access point;
transmitting the second communications from the root access point over the second portion of bandwidth of the first wireless link to the first access point;
transmitting the second communications from the first access point over the second portion of bandwidth of the second wireless link to the second access point; and
transmitting the second communications from the second access point over a fourth wireless link to the second communication device.

11. A network comprising:
a mesh network including multiple access points, the multiple access points wirelessly interconnected to provide wireless connectivity between multiple communication devices and a remote network;
a management resource operable to:
identify a service class assigned to a first communication device of the multiple communication devices; and
in accordance with the service class assigned to the first communication device, allocate use of wireless bandwidth in the mesh network to provide the first communication device access to the remote network at a data rate as specified by the service class.

12. The network as in claim 11, wherein the mesh network includes a first wireless link and a second wireless link, a portion of bandwidth on the first wireless link and a portion of bandwidth on the second wireless link allocated by the management resource to convey communications between the remote network and the first communication device.

13. The network as in claim 11, wherein the management resource is further operable to:
establish a first wireless link between a root access point of the mesh network and a first wireless access point in the mesh network, the root access point communicatively coupling the mesh network to the remote network; and
allocate a first portion of bandwidth in the first wireless link to convey communications from the root access point to the first communication device.

14. The network as in claim 13, wherein the allocated first portion of bandwidth in the first wireless link supports conveyance of the communications at the data rate as specified by the service class assigned to the communication device.

15. The network as in claim 14, wherein the communications are first communications; and
wherein a second portion of bandwidth in the first wireless link is allocated by the management resource to convey second communications from the root access point to a second communication device, the second portion of bandwidth in the first wireless link supporting conveyance of the second communications at a data rate as specified by a service class assigned to the second communication device.

16. The network as in claim 11, wherein the mesh network includes a first wireless link established between a root access point of the mesh network and a first wireless access point in the mesh network, the root access point coupling the mesh network to the remote network; and
wherein the mesh network includes a second wireless link established between the first wireless access point and a second wireless access point of the mesh network, the first communication device in wireless communication with the second wireless access point.

17. The network as in claim 16, wherein the mesh network includes a first communication path, the first communication path extending from the root access point to the first communication device, the first communication path including a first portion of bandwidth allocated from the first wireless link and a first portion of bandwidth from the second wireless link.

18. The network as in claim 17, wherein the root access point is operable to receive first communications, the root access point further operable to transmit the first communications from the root access point over the first portion of bandwidth of the first wireless link to the first access point, the first access point operable to transmit the first communications from the first access point over the first portion of bandwidth of the second wireless link to the second access point, the second access point operable to transmit the first communications from the second access point over a third wireless link to the first communication device.

19. The network as in claim 18, wherein the mesh network includes a second communication path extending from the root access point to a second communication device, the second communication path including a second portion of bandwidth allocated from the first wireless link and a second portion of bandwidth from the second wireless link.

20. The network as in claim 19, wherein the root access point is operable to receive second communications, the root access point operable to transmit the second communications from the root access point over the second portion of bandwidth of the first wireless link to the first access point, the first access point operable to transmit the second communications from the first access point over the second portion of bandwidth of the second wireless link to the second access point, the second access point operable to transmit the second communications from the second access point over a fourth wireless link to the second communication device.

21. Computer-readable hardware storage having instructions stored thereon, the instructions, when carried out by computer processor hardware, cause the computer processor hardware to:
 establish wireless connectivity amongst multiple interconnected access points in a mesh network, the mesh network providing multiple communication devices access to a remote network;
 identify a service class assigned to a first communication device of the multiple communication devices; and
 in accordance with the service class assigned to the first communication device, control use of wireless bandwidth in the mesh network to provide the first communication device access to the remote network at a data rate as specified by the service class.

* * * * *